United States Patent
Vostermans

[11] Patent Number: 6,129,286
[45] Date of Patent: Oct. 10, 2000

[54] VENTILATION SYSTEM, PARTICULARLY FOR USE IN THE AGRICULTURAL FIELD

[75] Inventor: Hendrik Louis Joseph Vostermans, Venlo, Netherlands

[73] Assignee: A. Vostermans B.V., Venlo, Netherlands

[21] Appl. No.: 09/202,029

[22] PCT Filed: Jun. 10, 1997

[86] PCT No.: PCT/NL97/00329

§ 371 Date: Dec. 8, 1998

§ 102(e) Date: Dec. 8, 1998

[87] PCT Pub. No.: WO97/47929

PCT Pub. Date: Dec. 18, 1997

[30] Foreign Application Priority Data

Jun. 10, 1996 [NL] Netherlands .................. 10 03 308

[51] Int. Cl.[7] .................................................. F24F 11/00
[52] U.S. Cl. ..................... 236/49.3; 236/51; 454/258
[58] Field of Search .................... 236/51, 49.1, 49.3, 236/94; 454/229, 256, 257, 258; 165/11.1, 208, 209; 62/125, 126, 127, 129, 175

[56] References Cited

U.S. PATENT DOCUMENTS

| | | | |
|---|---|---|---|
| 4,333,316 | 6/1982 | Stamp, Jr. et al. | 236/51 X |
| 5,326,027 | 7/1994 | Sulfstede | 236/51 |
| 5,407,129 | 4/1995 | Carey et al. | 236/49.3 X |

FOREIGN PATENT DOCUMENTS

| | | |
|---|---|---|
| 0 545 499 | 6/1993 | European Pat. Off. . |
| 39 17 482 A1 | 12/1990 | Germany . |

*Primary Examiner*—Harry B. Tanner
*Attorney, Agent, or Firm*—Pennie & Edmonds LLP

[57] ABSTRACT

A ventilation system, for example in the agricultural field. The ventilation system includes a ventilator and a processor module. Connections are included for connecting sensors associated with the ventilator to the processor module and on to a central processing unit. The sensors measure process quantities, such as the rotational speed, the temperature and the displaced air volume. The processor module is arranged in such a manner that in case of failure of the central processing unit and/or of the communication link between the processor module and the central processing unit, the processor module will control the ventilator on the basis of the process quantities measured by the sensors associated with the ventilator.

4 Claims, 1 Drawing Sheet

VENTILATION SYSTEM, PARTICULARLY FOR USE IN THE AGRICULTURAL FIELD

BACKGROUND OF THE INVENTION

The invention relates to a ventilation system, in particular for use in the agricultural field, comprising at least one ventilator which is coupled to an electromotor comprising at least one excitation winding, which is connected to a voltage source via a control unit, whereby said control unit includes a processor module comprising a digital computing circuit and at least one memory for storing control software and control quantities, which processor module includes communication means for exchanging data between the processor module and a remote central processing unit via a communication link.

A ventilation system of the above kind is disclosed in published European Patent Application No. 0 545 499. In this known system a ventilator is controlled by means of a remote central processing unit, which transmits control signals via a communication link to a processor module incorporated in the ventilator, which controls the ventilator on the basis of the signals being received. The processor module furthermore transmits status signals, such as the rotational speed and temperature of the ventilator, to the central processing unit, which in turn utilizes these signals for controlling the ventilator. A drawback of this known system for the remote control of one or more ventilators is the fact that in case of failure of the central processing unit and/or of the communication link between said unit and the processor module, all ventilators in the system will stop, with all its consequences. The aforesaid European document furthermore makes mention of the fact that in case of failure of the central processing unit and/or of the communication link, the processor module will control the ventilator to a preset ventilation level. Although the ventilator will not stop in that case but will continue to operate at a predetermined ventilation level, it will be apparent that under certain circumstances said ventilation level may differ rather much from the ventilation level which is desired in order to maintain the conditions in the space ventilated by the ventilator at an acceptable level. Ventilators of the kind to which the invention relates are frequently used in the agricultural field for ventilating cattle and poultry houses, for example, whereby the conditions in these spaces must be critically maintained at a precisely determined level. If the ventilator falls back to a predetermined fixed ventilation level in case of failure of the central processing unit and/or of the communication link, as is the case with the known system, the conditions in the space to be ventilated may become unacceptable after a very short time already.

SUMMARY OF THE INVENTION

An object of the invention is to provide a ventilation system suitable for use in industrial and agricultural applications, processes, etc., which overcomes the aforesaid drawback and which will control the ventilator in such a manner that the conditions in the space to be ventilated will remain acceptable, also in case of failure of the central unit and/or of the communication link.

In order to accomplish that objective the ventilation system according to the invention is characterized in that communication means the processor module of the ventilator also includes connections for connecting sensors associated with said ventilator for measuring process quantities, such as the rotational speed, the temperature, the displaced air volume, etc., and in that said processor module is arranged in such a manner that in case of failure of the central processing unit and/or of the communication link the processor module will control the ventilator on the basis of the process quantities measured by the sensors associated with said ventilator. In the system according to the invention each ventilator has its own sensors for measuring process quantities, which quantities are supplied to the processor module, whereby said module is arranged in such a manner that in case of failure of the central processing unit and/or of the communication link the processor module will control the ventilator on the basis of the measured process quantities. In this manner it is ensured that the ventilator is controlled in such a manner that the conditions in the space to be ventilated will continue to meet the respective requirements, also in case of failure of the central processing unit. An advantage of the system according to the invention is the fact that in case of a possible calamity each ventilator is controlled on the basis of the process quantities measured by the process sensors associated with the ventilator in question, while retaining the advantages of remote control.

Another embodiment of the system according to the invention is characterized in that said processor module is arranged in such a manner that during normal operation the ventilator is controlled by the processor module on the basis of the signals received by the central processing unit, whereby the quantities, such as status signals, measured by the sensors associated with the ventilator are supplied to the central processing unit. Said status signals may be taken account by the central processing unit in the monitoring controlling of the ventilator in question.

In another embodiment of the system according to the invention the processor module associated with each ventilator is provided with a display and control device. In this manner the operating staff are able to assess the situation for each individual ventilator, and, in case of a deviation from a desired situation, take action in all directions, possibly via the control device.

Another embodiment of the system according to the invention is characterized in that several ventilators are present, which are each provided with a processor module, wherein said processor module is incorporated in a network together with the central processing unit, wherein each ventilator is provided with associated sensors, which are connected to the processor module of the ventilator in question.

The invention furthermore relates to a ventilator suitable for use in a ventilation system according to the invention. The features of this ventilator are defined in more detail in the subclaims.

BRIEF DESCRIPTION OF THE DRAWING

The invention will be explained in more detail hereafter with reference to the drawing, which schematically shows an embodiment of a ventilation system according to the invention.

DETAILED DESCRIPTION OF THE INVENTION

Figure 1:
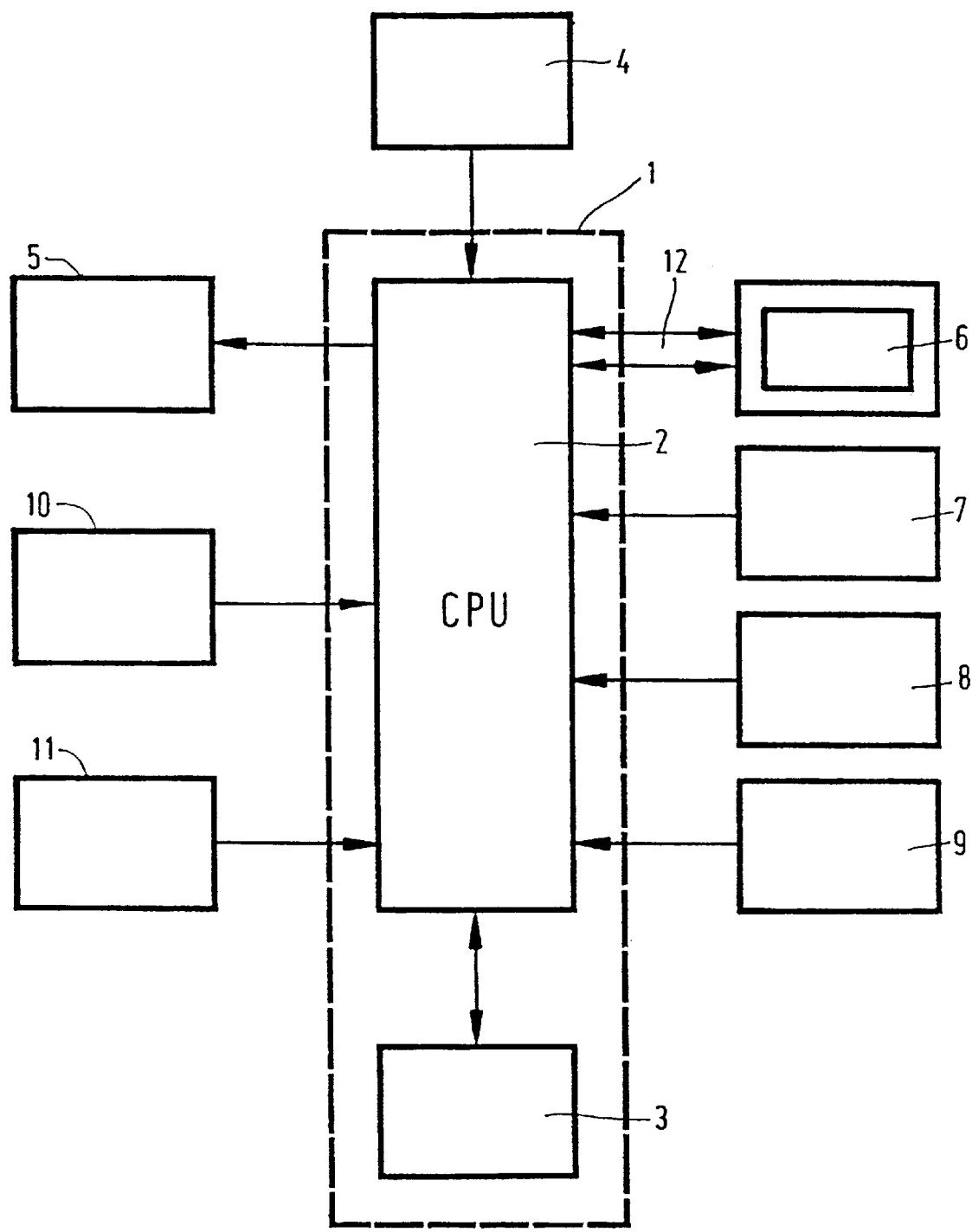
FIG. 1 is a block diagram of a control device for a ventilator according to the invention.

In the block diagram of FIG. 1 numeral 1 indicates a processor module including a control unit 2 and a memory 3. A high-voltage AC source 4 is connected to processor module 1, which connects said voltage source to ventilator 5. The control unit furthermore receives high-voltage current from voltage source 4 after said voltage has been converted by suitable means into low-voltage direct current. Furthermore a communication link 12 is connected to processor module 1, which communication link connects processor module 1 to a central processing unit 6. Also a temperature sensor 7, a potentiometer 8 and a sensor 9 for measuring the air flow through ventilator 5 are connected to processor module 1. Furthermore a rotational speed sensor 10 for measuring the rotational speed of the ventilator and a temperature sensor 11 for measuring the temperature in the ventilator are connected to processor module 1. The operation of the device is as follows: During normal operation ventilator 5 is controlled by means of control signals from the central processing unit 6, which signals are supplied to processor module 1 via communication link 12. Processor module 1 will cause ventilator 5 to operate at a particular desired rotational speed on the basis of said control signals. Temperature sensor 7 thereby measures the temperature in the space to be ventilated and supplies the temperature in the form of a signal to processor module 1. Another signal relating to the conditions in the space to be ventilated is generated by air flow sensor 9, which passes said signal to processor module 1. In this situation processor module 1 also receives signals relating to the ventilator speed via speed sensor 10 and signals relating to the ventilator temperature via temperature sensor 11. Said signals are all communicated from processor module 1, via communication link 12, to the central processing unit in the form of status signals, which processing unit processes said signals and takes them into account when deciding on the sending of control signals to the processor module. In this manner the conditions in the space to be ventilated can be controlled very well via the central processing unit.

Central processing unit 6 manages the long-term programme of ventilation requirements (and alterations thereof), for example the growth curve, the process curve, the drying cycle or the like (long-term).

In case of a possible failure of processing unit 6, processor module 1 will not receive any control signals from the processing unit any more and at that moment processor module 1 will decide to use the signals from sensors 7 and 9 as its own control quantities for controlling the situation of ventilator 5. In spite of the failure of central processing unit 6 the control system will continue to function, but now on the basis of signals received from its own sensors 7 and 9, so that the conditions in the space to be ventilated will still remain good. In this manner it is ensured that in case of calamities, such as failure of processing unit 6, the control system will continue to function in a very satisfactory manner. Processor module 1 has its own intelligence, with possibly a limited knowledge of the curve (action is taken centrally), and thus reacts to the last known information from the central unit (short-term). In certain circumstances the system may be provided with a display and control device 8, which makes it possible to see directly at the location of the ventilator what the situation is like, and if this situation differs from the desired situation, it is possible to take action manually via the control device.

Although the drawing shows a diagram of one ventilator provided with a processor module, several of these ventilators may be connected, each with their own processor module and communication link and sensors for measuring processor quantities, into a network, which is in turn connected to the central processing unit. Each ventilator may thereby be disposed in its own space to be ventilated, whereby all sensors associated with a respective ventilator are also accommodated within said space. In this manner it is possible, for example in case of failure of the central processing unit, for all ventilators to be controlled by their own processor modules on the basis of the process quantities measured by the process sensors associated with the ventilators in question. Furthermore only one or several of the ventilators may become disconnected from the central processing unit because of a communication link failure, in which case each of the disconnected ventilators will be controlled by their own processor module on the basis of information from the sensors associated with the ventilators in question. In this manner a large degree of protection is obtained in case of failure of the communication link or of the central processing unit, because it is possible to interfere with the operation of central processing unit 6 and processor module 1 via the control device.

Because of the division into long-term and short-term control data a continuous connection between 1 and 6 is not required. It is possible, therefore, to transmit other communications via the same line—between control data transmissions—whilst also non-continuous transmission is possible, for example 2–3 times a day via telephone lines and a remote central control unit. Control may be required following an alteration, for example an adaptation of the curve, or in the event that conditions have changed.

What is claimed is:

1. A ventilation system, in particular for use in the agricultural field, comprising at least one ventilator (5) which is coupled to an electromotor comprising at least one excitation winding, which is connected to a voltage source (4) via a control unit, whereby said control unit includes a processor module (1) comprising a digital computing circuit and at least one memory (3) for storing control software and control quantities, which processor module includes communication link (12) between said processor module (1) and a remote central processing unit (6) for exchanging data via said communication link (12), said ventilator being provided with a first sensor for measuring the rotational speed thereof connected to said processor module, characterized in that besides said communication link the processor module (1) of said ventilator (5) also includes connections to which further sensors (7,9) associated with said ventilator are connected for measuring process quantities, such as the temperature and the displaced air volume, and in that said processor module (1) is arranged in such a manner that in case of failure of said central processing unit (6) and/or of said communication link (12), said processor module (1) controls said ventilator on the basis of the process quantities measured by the sensors (7,9) associated with said ventilator (5).

2. A ventilation system according to claim 1, wherein said processor module (1) is arranged in such a manner that during normal operation said ventilator (5) is controlled by said processor module on the basis of the signals received from said central processing unit (6), characterized in that the quantities measured by the sensors (7,9) associated with said ventilator are supplied to said central processing unit as status signals.

3. A ventilation system according to claim 1 or 2, characterized in that the processor module (1) associated with each ventilator (5) is provided with a display and control device (8).

4. A ventilation system according to claim 1 or 2, characterized in that said system comprises several ventilators which are each provided with an associated processor module, wherein each of said processor modules is incorporated in a network together with said central processing unit, and wherein each ventilator is provided with associated sensors, which are connected to the respective processor module associated with the ventilator.

* * * * *